Figure 1:
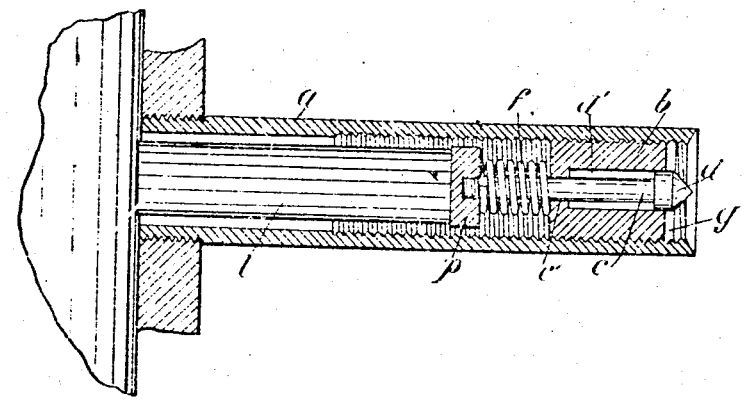

No. 870,875. PATENTED NOV. 12, 1907.
E. L. FAUL.
CANDLESTICK LUBRICATOR.
APPLICATION FILED APR. 30, 1907.

Witnesses:
Veronica Braun
M. A. Helmke

Edwin L. Faul
Inventor
by Schreiter & Mathews
his Att'ys

UNITED STATES PATENT OFFICE.

EDWIN L. FAUL, OF NEW YORK, N. Y., ASSIGNOR TO WILLIAM J. FAUL CO., OF NEW YORK, N. Y., A CORPORATION OF NEW YORK.

CANDLESTICK-LUBRICATOR.

No. 870,875.   Specification of Letters Patent.   Patented Nov. 12, 1907.

Application filed April 30, 1907. Serial No. 371,178.

*To all whom it may concern:*

Be it known that I, EDWIN L. FAUL, a citizen of the United States, and a resident of the city of New York, borough of Brooklyn, county of Kings, and State of New York, have invented new and useful Improvements in Candlestick-Lubricators, of which the following is a specification.

My invention relates to devices for lubricating bearings of shafts, and consists of the hereinafter more fully described construction of such a device, known in the art as candlestick lubricator. Such candlestick lubricators as heretofore known in the art, comprise a cup in the form of an interiorly screw-threaded tube, of the same form as tube $a$, shown in the drawings; a piston loosely fitted into the cup, a spiral spring and an exteriorly screw-threaded plug. Such lubricator is usually screwed into the oil hole of a shaft-bearing, and the lubricating substance, made in the form of a stick, is inserted into the cup; the piston is set on top of the stick; the spring on top of the piston and finally the plug is screwed in, to compress the spring, and cause it to press the stick of lubricating substance against the shaft to be lubricated. The spring may be connected by a turn to the piston and to the plug.

It is necessary to press the stick of lubricant against the shaft with as nearly constant pressure as possible, and the tender of the machinery is required to screw in the plug further into the cup from time to time, as the lubricant is being used up by the friction of the shaft thereon. The defects of the construction of such candlestick lubricators, as heretofore known, are that the spring between the piston and the plug is often brought into a slanting position, whereby the piston and spring are wedged in in the cup, which interferes with the proper operation of the lubricator, frequently rendering it entirely inoperative. It is then frequently rendered difficult to remove the spring and the plug from the cup, and in so doing, the spring is damaged and rendered useless. The attempts to remedy this by joining the spring to the piston, and to the plug, have not proved successful, and in fact, this frequently results only in contorting or untwisting the spring, when the plug is being screwed in or out. Furthermore, owing to the construction of the device, as heretofore known, the tender of the machinery is wholly unable to determine how far the plug should be screwed in, to set the spring at the proper tension. Thus it frequently happens that the plug is screwed in too far, thus causing the spring to be excessively compressed or the piston pressed into the comparatively soft lubricating stick, whereby again the proper function of the lubricating device is interfered with, as the spring cannot be made of such strength to overcome the friction of the lubricating stick, or to resist the excessive screwing in of the plug.

Figure 2:
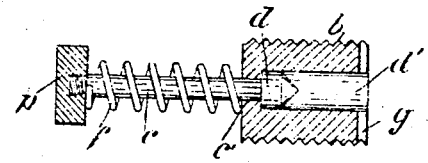
Figure 3:
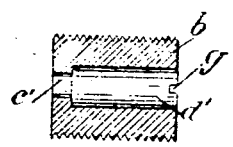

The objects of my invention are to obviate the causes of these defects, and to this end I have devised the improved candlestick lubricator shown in the accompanying drawings, wherein:

Figure 1 is a longitudinal sectional view of a candlestick lubricator, embodying my invention; Fig. 2 is a similar view of the plug and piston; Fig. 3, a longitudinal sectional view of the plug; this view being at right angles to that shown in Figs. 1 and 2.

The improvements embodied in the construction of the lubricator, shown in the drawings, consist, (1) in making the plug $b$ hollow as shown in Fig. 3, (2) in providing a stem $c$, snugly fitted into the bore $c'$ of the plug, for the piston $p$ and (3) in providing the head $d$ on the stem, the head being fitted into the bore $d'$.

The bores $c'$ and $d'$ are made by drills, and the groove $g$ is cut by a die in the usual manner. Plug $b$ must be made sufficiently long to permit the receding into it of such portion of the stem $c$ as will bring the head $d$ of the stem into the outer opening of the bore $d'$, when the spring $f$ is compressed to the permissible extent, and is provided with a notch $g$ to enable a screw driver to be inserted therein, and to turn the plug when inserted in the cup, as shown in Fig. 1. This notch, however, is accessible to a screw driver only when the spring $f$, acting on the piston $p$, as shown in Fig. 2, has drawn enough of the stem $c$ from the plug $b$ to move the head $d$ beyond the notch $g$; as long as the apparatus is in the position shown in Fig. 1, head $d$ fills the mouth of the bore $d'$, and thus prevents the inserting of a screw driver into notch $g$ and the plug can not be screwed in any deeper.

The length of the stem $c$ and of the plug $b$ are determined according to the calculated consumption of the lubricant and the frequency of inspection. Piston $p$ is provided with a screw-threaded bore and a corresponding screw-thread is provided on the end of the stem $c$. The head $d$ of the stem, serves as an indicator of the position of the piston $p$. When in the position shown in Fig. 1, it prevents further screwing in of the plug $d$, and as the length of the stem $c$ is proportionated to the length of the plug, with consideration for the greatest permissible compression of the spring $f$, any excessive compression of the spring $f$ is thus prevented and a constantly free and easy operation of the device is secured.

In assembling the device, the stem $c$ is first slid into the bore $c'$, the spring $f$ slid thereon, and then the piston $p$ is screwed on its end. Stem $c$ serves as a guide for the piston $p$, thus keeping it constantly in position at right angles to the axis of the cup, and insuring its free motion. It also serves as a support for the spring $f$, and avoids its being brought into a slanting position, and being wedged in the cup.

The parts are brought in the position shown in Fig. 2, only when the lubricant $l$ is being consumed and therefore, when the lubricant is not being consumed the parts remain in the position shown in Fig. 1. Thus the device serves also as an indicator of the proper operation of the lubricator. If, for instance the lubricator would stop operating, the machine tender will find the head $d$ in the same position where he left it when last setting the lubricator, and will thus be informed that the lubricator does not operate. And again, if the cup should have been left accidentally empty, or if the lubricant had melted, the machine tender will find, when coming to set the lubricator, that he can screw in the plug $b$ as far as the screw-thread goes, without having the screw driver pushed out. In such a case the head will not enter the mouth of the bore $d'$, as the piston $p$ will strike no resistance.

Instead of providing the plug with the notch $g$, as shown in the drawing, the bore $d'$ may be squared or other similar means may be provided for turning the plug $b$ in the cup $a$. The making of the notch $g$ however, is the most suitable and simple way of providing such means. It is preferable to make the head $d$ of the stem conically pointed, as shown in Fig. 1, particularly for lubricators used in not well accessible places, where the machine tender may not be able to use his eyes.
The position of the parts may then be ascertained by inserting the screw driver into the cup. It will slide off on the conical apex of the head $d$, when the plug is screwed in as far as it should go. It is, however, not necessary or essential for an efficient function of my device, that the head $d$ be so conically shaped, though it is preferable for the reasons stated.

I claim as my invention:—

1. A candlestick lubricator, comprising an interiorly screw-threaded tube, an exteriorly screw-threaded plug fitted therein; a recessed bore in the plug; a stem fitted into the bore of the plug; a piston loosely fitted into the tube set on the stem, a head on the other end of the stem, fitted into the recessed portion of the bore, and a spring set on the stem between the piston and the plug.

2. A candlestick lubricator, comprising an interiorly screw-threaded tube, and an exteriorly screw-threaded plug fitted therein; a bore in the plug; a stem fitted in the bore of the plug; a piston set on the stem, a conically shaped head on the other end of the stem fitted into the recessed portion of the bore, and a spring set on the stem between the piston and the plug.

3. A candlestick lubricator, comprising an interiorly screw-threaded tube and an exteriorly screw-threaded plug, slotted on one end fitted therein; a bore in the plug; a stem fitted to the bore of the plug; a head on one end of the stem and a piston on its other end, the head being adapted to recede into the bore of the plug when the piston is drawn out, and a spring set on the stem between the piston and the plug.

EDWIN L. FAUL.

Witnesses:
M. A. HELMKE,
V. BRAUN.